P. M. FREER.
VEHICLE SPRING.
APPLICATION FILED MAR. 31, 1911.
1,052,233.
Patented Feb. 4, 1913.
3 SHEETS—SHEET 3.
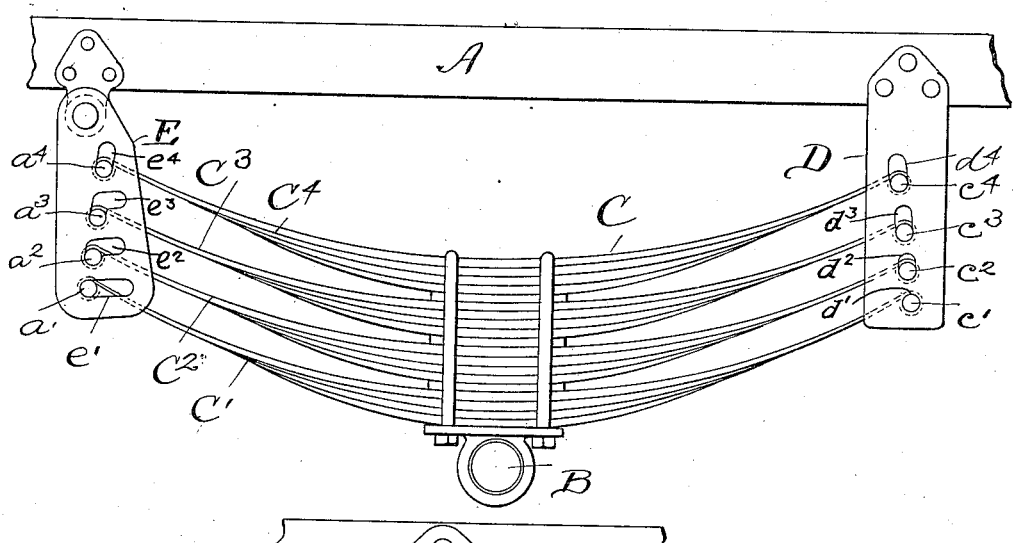

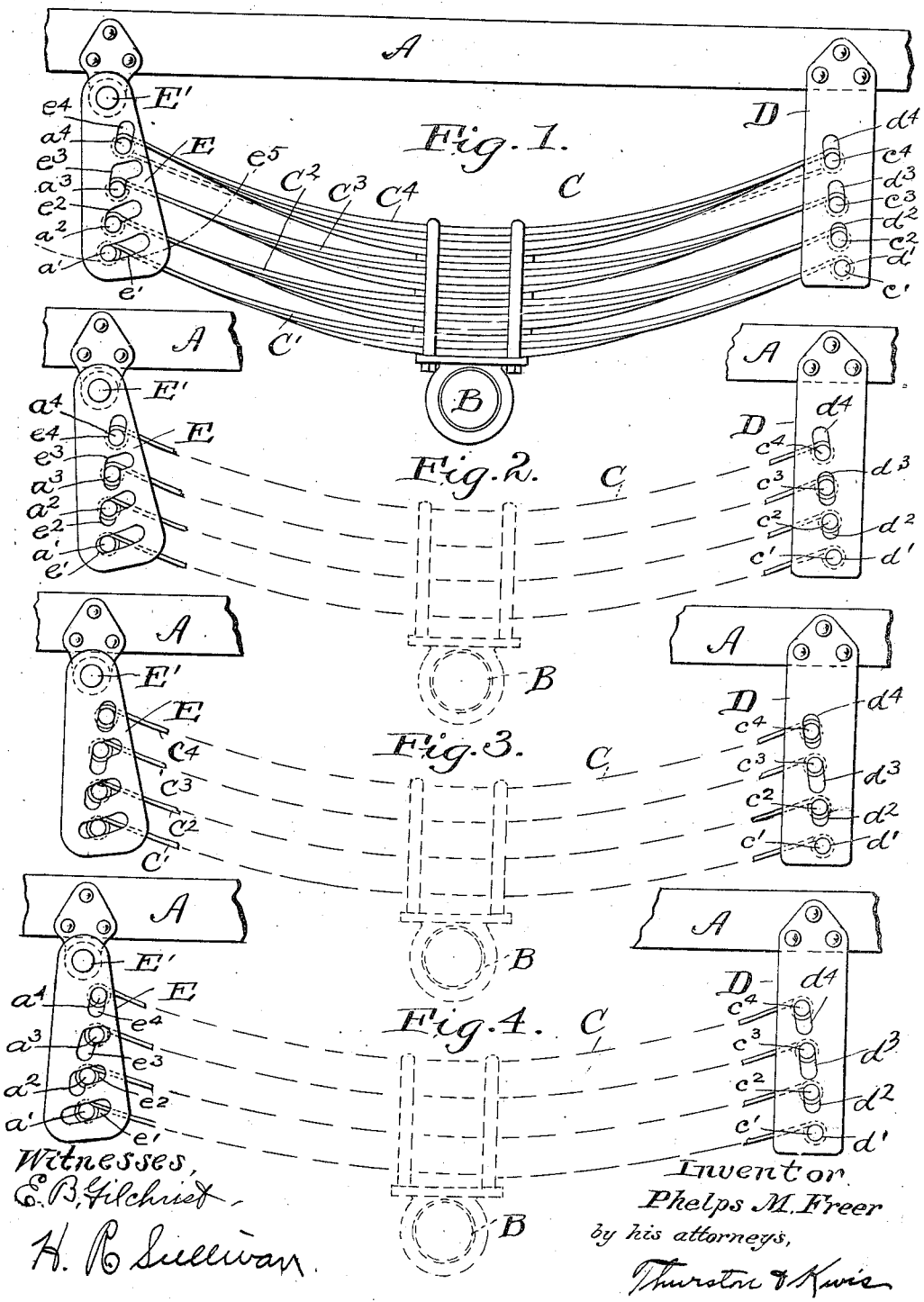

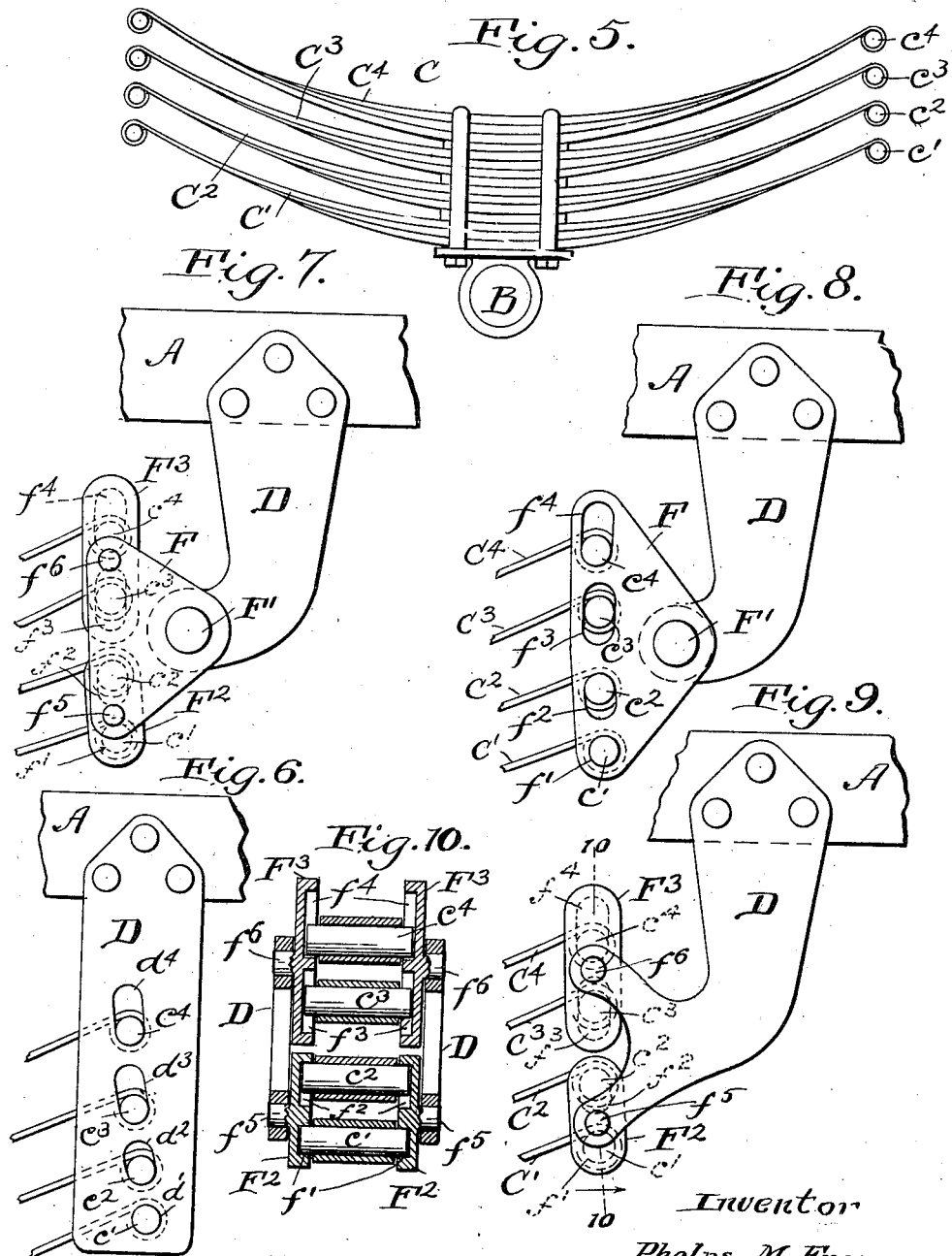

UNITED STATES PATENT OFFICE.

PHELPS M. FREER, OF DETROIT, MICHIGAN.

VEHICLE-SPRING.

1,052,233.  Specification of Letters Patent.  Patented Feb. 4, 1913.

Application filed March 31, 1911. Serial No. 618,249.

*To all whom it may concern:*

Be it known that I, PHELPS M. FREER, a citizen of the United States, residing at Detroit, in the county of Wayne and State of Michigan, have invented a certain new and useful Improvement in Vehicle-Springs, of which the following is a full, clear, and exact description.

This invention relates to vehicle springs, particularly to springs for automobiles or like vehicles in which it is now customary to interpose the springs between the axles and the chassis or vehicle body where they serve not only to carry the load but also have driving functions, the axles not being directly connected to each other by any special reach frame or "running gear" for the direct transmission of driving power from one to the other.

The principal objects of the invention are, first, to provide springs divided into sections which are so arranged as to go into action successively under increasing loads so as to secure uniformity of resilience of the spring, as a whole, under varying loads; second, to connect the ends of the spring sections to front and rear hangers in such manner that, as they go into action successively, compensation is made for the lengthening of the chords of those sections in action as their ends are depressed and the curvature of their arcs reduced toward flattening without producing conflicting strains between the several sections through unequal elongation or irregular relative action; third, to so arrange and proportion the several parts that as the load is increased the increase is taken up by the sections newly going into action and does not materially add to the load on those sections already in action, nor materially increase their flexure; fourth, to preserve the constancy of the driving effect of all the sections of the spring regardless of the load or flexure condition of any of them; and fifth, to so arrange the parts that upon any sudden jolting of the vehicle or decrease of the load each of the several sections in action will exercise a restraining effect upon the others which will check swift reflex action of the spring as a whole and compel its gradual return toward normal conditions. These and such other objects as may hereinafter appear in this specification and the appended claims may be carried into effect by the constructions illustrated in the accompanying drawings which show present preferred forms of springs, connections, etc., and some modification thereof.

Figure 1 is a side elevation of a preferred form of spring and the hangers connecting it to the chassis of an automobile, this construction being particularly adapted for the front axle of the vehicle which is shown clamp-connected at mid length of the spring. In this figure the spring sections are shown in the positions assumed under the normal load of the chassis and parts mounted thereon,—the lower section only of the spring being in action under load. Fig. 2 is a similar view of the same parts in the positions assumed when the second lowest section is brought into action under load. Figs. 3 and 4 are similar views of the same parts when the third and the fourth or top sections are respectively brought into action. Fig. 5 illustrates a series of spring sections grouped as before but having the lamina of the upper-section spring reversed in order that this section may act in opposition to the others to check too quick reactions in them. Fig. 6 is an enlarged view of the preferred form of front hanger. Figs. 7, 8, 9 and 10 illustrate on the same scale as Fig. 6 several modifications of the front hanger with the spring ends attached to rocking side links or yokes which are pivotally mounted in the rigid front hanger; Fig. 10 being a section on the line 10, 10 of Fig. 9. Fig. 11 illustrates a spring composed of sections, as before, with modifications in the forms of the slots in the rear hanger. Fig. 12 shows a modification of the grouping of the slots in the rear hanger adapted to permit of the closer spacing of the main leaves of the springs of the several sections.

In the constructions shown, particularly in Figs. 1 to 4, inclusive, A is one of the side bars of the chassis frame of an automobile, B the front axle thereof and C the spring, secured as usual by clamping at its mid length to the axle, and at its front and rear end respectively to hangers D and E depending from the chassis frame. The front hanger D is preferably rigidly secured and the rear hanger E pivotally connected at E' to the chassis frame, as shown.

The spring is made in several sections, four being shown in the drawings and indicated respectively by reference characters $C'$, $C^2$, $C^3$ and $C^4$. The main or longer leaf of each section extends beyond the others and is provided at each end with an eye or loop in which is secured a pin that projects laterally beyond the ends of the eye and takes into suitable apertures, slots or recesses in the respective hangers. These hangers are duplicated or doubled so that the spring ends lie between pairs of hangers, as will be readily understood.

In Fig. 1 the parts are shown in normal position, supposedly that in which the normal load consisting of the chassis with its usual fixtures and mountings is being carried by spring section $C'$, the lowest of the series of sections. The hanger aperture $d'$ for the pin $c'$ of this spring closely embraces the pin which, having no space for free movement in the aperture, must follow the movements of the hanger. The next slot $d^2$, above, is slightly elongated and preferably inclined, or curved concentrically about an axial point near the center and top of spring $C^2$. In Fig. 1 the pin $c^2$ of this spring rests in the lower end of slot $d^2$ and there remains neutral until the load has increased beyond the sustaining power of spring $C'$. Then the hanger is depressed and the pin $c^2$ engages the upper end of slot $d^2$ and the spring becomes an active participant in carrying the load. This first load depression of the hanger drops the lower end of slot $d^3$ away from the pin $c^3$ of spring $C^3$,—the said pin at a certain stage of this first loading standing at or near the middle of the slot $d^3$, as shown in Fig. 2. The spring section $C^4$ is preferably, though not necessarily, so constructed as to act reflexly, at first, in opposition to the other sections, for the purpose of preventing excessive rebound when the spring as a whole is under light load. The dotted lines in Fig. 1 show its normal free position, the spring exerting a downward pressure on its pin $c^4$ in the bottom of the slot $d^4$ under the load conditions of this figure. Now, when the load is increased to bring spring $C^2$ into action the depression of the hanger D permits the pin $c^4$ to move down with the hanger, to its normal position (Fig. 2), in which the spring is strictly neutral except perhaps that it may operate to check excessive reflexion of those other sections $C'$ and $C^2$ in active service. On further loading, say to bring spring $C^3$ into action, the hanger D is further depressed until the pin $c^3$ lies at the top of the slot $d^3$ and assumes a portion of the increasing load. The pin $c^4$ on the spring $C^4$ also at this moment lies near the top of its slot $d^4$ but the spring still remains neutral. This situation is shown in Fig. 3. On still further loading the pin $c^4$ of the spring $C^4$ goes into active service and assumes its proportion of the increased load; this condition being shown in Fig. 4, where all of the pins $c'$, $c^2$, $c^3$ and $c^4$ are at the tops of their respective $d$ slots in the front hanger D and are all bearing load. It will be observed that all of the slots are so positioned and shaped as to stand practically at right angles to the lines of thrust or pull of the respective springs and that the driving function of the springs in their connection with the hanger remains practically constant through all changes of relative elevation that may be caused by variation in the loading or by the vertical vibrations caused by passing over rough roadways. The front hanger D is preferably fixed or rigidly connected to the chassis frame but under some conditions of service it may be desirable to have the spring suspension or connection of such a nature as will admit of the springs automatically adjusting themselves to avoid unequal strains due to the lengthening of the chords of their arcs when their ends are irregularly depressed and straightened out under loading. To effect this end several modifications of the front hanger that most readily now suggest themselves are shown in Figs. 7, 8, 9 and 10.

In Fig. 7 side yokes F are pivotally mounted at $F'$ in the lower ends of the hangers D and, projecting away from the hanger, support link bars $F^2$ and $F^3$ on integral stud-pin pivots $f^5$ and $f^6$, the inner faces of the link bars having grooves or recesses $f'$, $f^2$ and $f^3$, $f^4$, respectively, in which the pins $c'$, $c^2$, $c^3$ and $c^4$ are engaged and adapted to operate in the manner just described for the slots $d'$, $d^2$, $d^3$ and $d^4$ of the hanger D.

In Fig. 8 the yoke F is pivotally mounted as at $F'$ to the hanger D and is provided with slots, grooves or recesses $f'$, $f^2$, $f^3$ and $f^4$ which are engaged by the pins $c'$, $c^2$, $c^3$ and $c^4$ of the springs in same manner as are the slots $d$, etc., of the hanger D, as will, doubtless, be readily understood without more extended description.

Figs. 9 and 10 show a construction in which link bars $F^2$ and $F^3$ are pivoted on integral stud pins $f^5$ and $f^6$ directly to the hanger, thereby omitting the side yokes F shown in Fig. 7. These links are recessed or grooved as at $f'$, $f^2$ and $f^3$, $f^4$ respectively for engagement with the spring pins $c'$, etc., as described in connection with Fig. 7.

These few modifications indicate the wide range of changes that may be made within the scope of this invention in suspending the front or the driving ends of the spring sections to a rigid hanger that will take and withstand the driving pull or thrust of the spring sections.

In the rear hangers and the spring connections thereto, conditions different from those of the front hangers are to be met and provided for. The rear hangers E are suspended from pivotal connections $E'$ with the chassis frame A in order to provide for the lengthening of the springs, as their ends are depressed and straightened under loads, by swinging the lower free end of the hanger away from the axle. These hangers E are apertured, slotted or grooved as at $e'$, $e^2$, $e^3$ and $e^4$ to receive the pins $a'$, $a^2$, $a^3$ and $a^4$ at the rear ends of the respective spring sections. Much importance lies in the formation and relative positions of these slots. It is desirable that the swinging movements of the hangers be caused and controlled by the lengthening movements of the springs as they respectively go into load action, and that the movements of the springs be also controlled, in a manner, by the hangers, to prevent too sudden reflex action of the springs when suddenly relieved of the load. Both of these results may be obtained, in varying degrees, through the shapes and positions of the slots.

In Fig. 1 the pin $a'$ of the lower spring lies, normally, in the outer or rear end of the lower slot $e'$ of the hanger E. From this point the slot extends forwardly with an upward inclination, and is, preferably, curved eccentrically to the axis E' of the hanger, its line of curvature lying inside of a concentric line $e^5$ drawn from the lower end of the slot as shown. As a result of this, the pin $a'$, under increased loads on the vehicle and the further depressions and swinging movements of the hanger, remains in substantially the same plane of elevation without material increase of flexure or the assumption of material increase of its load. In this construction (Figs. 1 to 4) the second slot $e^2$ is formed with a slight rise at its outer end which merges at top in a forwardly extending portion which is eccentrically curved to correspond with the curvature of slot $e'$. The rising portion of the slot inclines forwardly and may be slightly curved about an axial point at the mid length of the spring and just above its top. The pin $a^2$ normally lies inactive at the bottom of this rising part of the slot, but under increased loading the hanger is depressed until the pin contacts with the top wall at the junction of the two portions of the slot, and then under further increased load the spring end is depressed, straightened out and lengthened. This lengthening of the spring forces the pin $a^2$ against the rear wall of the slot, at the junction, and forces the hanger to swing rearwardly on its pivot pin E'. Now, as the hanger thus moves rearwardly the lower slot $e'$ moves over the pin $a'$ which passes into a higher portion of the slot that compensates for the depression of the hanger and practically leaves the pin $a'$ at its normal elevation above the ground without increasing its load or the degree of its flexure. Slot $e^3$ is formed like slot $e^2$ excepting that its rising portion is longer and its forwardly extended, eccentric portion shorter than in $e^2$. When the pin $a^2$ is in active working position against the upper wall of its slot $e^2$ the pin $a^3$ has moved away from the bottom of its slot but is still out of contact with the top wall thereof (as in Fig. 2). On a further increase of the load the pin $a^3$ goes into action in the same manner as did pin $a^2$ just described, contacting with the upper and outer walls of the slot $e^3$ and through this last mentioned contact swinging the hanger still farther rearward on its pivot. This action of the hanger moves the pins $a'$ and $a^2$ still farther into or along their slots and, owing to the upward inclination of these slots, the pins retain substantially their normal elevation. As to spring section $C^4$, its pin and slot, it will be observed that the slot $e^4$ is upright for its entire length and that normally the pin $a^4$ lies against its lower end. As before stated this spring is preferably set in opposition to those below it so that in the normal positions shown in Fig. 1 the pin $a^4$ is exerting downward pressure on the lower end of the slot in the hanger. In loading, however, the first effect of the depression of the hanger which brings spring $C^2$ into load action is to permit the pin $a^4$ to sink with the hanger to a position where, while the pin is still in contact with the bottom of the slot (as in Fig. 2), the spring has become neutral and exerts no force either up, down or endwise. On the second increase of load above described the further depression of the hanger will locate the pin $a^4$ about midway of its slot (as in Fig. 3), the spring $C^4$ being still neutral. On the third increase of load the further depression of the hanger brings the pin $a^4$ into engagement with the upper end of the slot $e^4$ (as in Fig. 4), and in position to assume its proportion of any further increase of the load that may be had. On the assumption of load by this spring $C^4$ it, like the others preceding it into action, straightens and its pin pushes against the rear side of the slot, swinging the hanger still farther backward on its pivot, thereby moving the other pins $a'$, $a^2$ and $a^3$ still farther forward in their respective slots, against the top sides of which they are all bearing to sustain their loads.

On the reverse or unloading process, no matter how suddenly effected, the several spring sections cannot snap back to their normal positions. In this reverse action spring $C^4$ must first relax and bend sufficiently to have its pin $a^4$ draw the hanger back to a point where the pin $a^3$ of the next spring may become engaged with the front side of the vertical portion of its slot $e^3$; this in turn continues the swinging movement of the hanger until the pin $a^2$ can similarly engage the front side of the vertical portion of its slot $e^2$ and draw the hanger back to a point where all the elements may resume their original normal positions. This successive step by step action therefore prevents the freeing of all of the spring sections simultaneously and they cannot therefore all snap back together, but must return to their normal position in the order in which they left them.

This arrangement of parts and order of operation is symmetrical and orderly but need not of necessity be followed with exactitude, for some of the details might be changed and the order of the spring sections going into action altered at pleasure or to adapt the mechanism to any set of conditions differing from those for which this was specially devised.

In the modification shown by Fig. 11 the slots $m'$, $m^2$, $m^3$ and $m^4$ in the rear hanger E have their forwardly extending portions much less inclined than those of Figs. 1 to 4. These portions of the slots in Fig. 11 may be straight, or slightly curved as shown, the curvature being preferably eccentric outside of a curve which is concentric about the axis of the hanger pivot E'. In this construction the load effects of the spring sections differ from that of the construction of Figs. 1 to 4, in which the increasing load is taken up by the springs newly coming into action while the load and flexure of those already in action are not materially changed. In the structure of Fig. 11, however, with increasing loads, the tangential formation of the forwardly extending portions of the slots causes each spring section already in action to assume in addition a portion of the increasing load and to increasingly bend or flex in proportion to the increase of load put upon it.

The following table while not purporting to be exact in the relative values of the figures stated, will clearly illustrate the principle of the distribution among the several spring sections of increasing loading.

| Size of loads, say in lbs. | Theoretical distribution of increasing loads among spring-sections. | | | |
| --- | --- | --- | --- | --- |
| | No. 1. | No. 2. | No. 3. | No. 4. |
| 100 | 100 | 0 | 0 | 0 |
| 200 | 125 | 75 | 0 | 0 |
| 300 | 140 | 105 | 55 | 0 |
| 400 | 150 | 125 | 85 | 40 |

In this illustration the springs should be so relatively proportioned in strength that the first spring to come into action would assume a smaller share of the increased load than any of the others and the last spring in action the greatest share, with proportionate increases between the first and last spring coming into action on each addition to the load. This, however, is a mere matter of arranging springs of differing strengths and resiliency and may be changed in many ways to suit differing requirements and tastes.

Fig. 12 illustrates an irregular grouping of the slots $e'$, $e^2$, $e^3$, $e^4$ in the rear hanger E with the view of permitting the extreme ends of the several spring sections to lie substantially parallel and in closer proximity than with the arrangements of the slots of the preceding figures. Instead of mere pins $a$ at the ends of the spring sections engaging the slots in the hangers, anti-friction rollers $c^6$ may be used as shown in Fig. 12; and in order to protect these pins or rollers and the working surfaces of the slots from grit or dust the entire lower ends of the hangers and of the ends of the springs may be inclosed in dust-proof oil-retaining casings in a manner now so common and well understood as to need no extended description.

In the particular structure chosen to illustrate the invention, four spring sections are employed, but it is not intended to confine the invention to this or to any greater or lesser number of sections, and while the description sets out particular functions for certain of the individual sections, it should be understood that two or more sections may be adapted to operate either simultaneously or successively in the same manner. For instance, the section C' is described as carrying the normal load of the chassis, etc., while sections $C^2$ and $C^3$ are neutral and section $C^4$ is acting depressively on the hanger, adding its pressure to the chassis load normally carried by section C'.

Having thus described my invention, what I claim is:

1. A spring for vehicles composed of a plurality of sections united and connected at the center on an axle support, and supports for the ends of the spring, the sections being connected individually to the supports and the connections being such that as the load on the spring is increased, the sections go into action separately and successively, and the load increase is so distributed that those sections which go latest into action receive the greatest relative proportions of the load increase.

2. A spring suspension for vehicles comprising a spring composed of a plurality of sections united and connected at the center to an axle support load supports for the ends of the spring, the sections having separate connections with the supports which are so arranged that certain of the sections have different degrees of free movement relative to the supports and go into action separately and successively, as the load on the spring is increased, such load increase being distributed among the sections in action in greatest proportion to those sections which go latest into action, whereby the first section in action receives the least and the last section the greatest proportion of the load increase.

3. In combination with a vehicle frame and axle, a spring composed of a plurality of sections united and connected to an axle between the ends thereof, and hangers between the frame and the ends of the spring, the sections being connected separately to the hangers and part of said sections having connections which permit varying degrees of free relative movement between the sections and hangers so that as the load on the spring is varied, said sections go into or out of action separately and successively, so that load increase is distributed among said sections in greatest relative proportions to those sections going latest into action.

4. In combination with a vehicle frame and axle, a spring arranged between the same and composed of a plurality of sections united at the center and connected to the axle, means comprising hangers connecting the frame and the ends of the spring sections, part of the sections having pin and slot connections with the hangers, the slots being of varying lengths which permit varying degrees of free relative movement between the sections and the hangers.

5. In combination with a vehicle frame and axle, a spring arranged between the same and composed of a plurality of sections united and connected at the center to the axle, and a hanger pivotally connected to the frame and having pin and slot connections with the different spring sections, said connections permitting the sections to go in or out of action separately and successively as the load on the spring is varied.

6. The combination with a vehicle frame and axle, a spring arranged between the same and composed of a plurality of sections united and connected at the center to the axle, a hanger connecting the spring to the frame and connected separately to the different sections, the connections between the spring sections and the hanger including elongated inclined slots in the hanger, and pins on the spring sections engaging in said slots.

7. In combination with a vehicle frame and axle, a spring arranged between the same and composed of a plurality of sections united and connected at the center to the axle, a hanger connected to the frame and connected to the different sections of the springs, the connections between the sections and the hanger including slots in the hanger, and pins on the sections loosely engaging in said slots, one of the slots extending laterally and substantially horizontally and the remaining slots having upright portions of different lengths.

8. In combination with a vehicle frame and an axle, a spring composed of a plurality of sections united together and connected at their centers to the axle, a pendent hanger pivotally connected to the frame and provided with a plurality of upright apertures of progressively increasing lengths, with pins on the ends of the spring sections engaging said apertures, whereby an increasing load depression of the hanger will bring said pins successively into load bearing contact with the upper ends of their respective apertures.

9. In combination with a vehicle frame and an axle, a spring composed of a plurality of sections united together and connected at their centers to the axle, a pendent hanger pivotally connected to the frame and provided with a plurality of upright apertures of progressively increasing lengths, with pins on the ends of the spring sections engaging the lower ends of said apertures when under normal load of the vehicle frame, one or more of said springs being adapted to carry said normal load while others are neutral until brought into action successively by further load depression of the hanger.

10. In combination with a vehicle frame and an axle, a spring composed of a plurality of sections united together and connected at their centers to the axle, a pendent hanger pivotally connected to the frame and provided with a plurality of upright apertures of progressively increasing lengths, with pins on the ends of the spring sections engaging the lower ends of said apertures when under normal load of the vehicle frame, one or more of said springs being adapted to carry said normal load while others are neutral until brought into action successively by further load depression of the hanger, while others may exert a downward pressure on the hanger until it is depressed below its normal position, whereby said down-pressing springs may act to check too sudden upward rebound of the hanger.

11. In combination with a vehicle frame and an axle, a spring composed of a plurality of independent sections which are connected together and to the axle at their centers, a pendent hanger pivotally connected to the frame and provided with a plurality of apertures or slots which change in form successively from extremes of lateral, slightly inclined upward to upright slightly inclined in toward the center of the springs, the intermediates having lateral portions of progressively diminishing lengths, and upright portions of gradually increasing lengths, pins carried by the spring sections and engaging said apertures, the pins when in said upright portions of the apertures holding the hanger from swinging on its pivot beyond fixed limits, and when in said lateral portions releasing successively the swing of the hanger, and while receiving successive additions of load not being materially further depressed and straightened by reason of the upward inclination of the lateral portions of the slots.

12. In combination with a vehicle frame and an axle, a spring composed of a plurality of independent sections which are connected together and to the axle at their centers, a pendent hanger pivotally connected to the frame and provided with a plurality of apertures or slots which change in form successively from extremes of lateral and slightly inclined upward to upright and slightly inclined inward toward the centers of the spring, the intermediates having lateral portions of progressively diminishing lengths and upright portions of progressively increasing lengths, pins carried on the ends of said spring sections and under normal load of the frame lying in the outer or lower ends of said apertures, whereby those pins lying in the upright portions of said apertures prevent the hanger from swinging on its pivot until it is depressed sufficiently to lower the lateral portions of the apertures successively to the planes of their respective pins when continued load depression of the hanger will cause the spring sections to be successively depressed, straightened and lengthened and their pins to thrust against the outer walls of the upright portions of the apertures and cause the hanger to swing outwardly step by step, whereby the spring sections are restrained from action except as each is released through the depression and swinging of the hanger by another section, thereby holding them against going simultaneously into action and compelling them to act successively.

In testimony whereof, I hereunto affix my signature in the presence of two witnesses.

PHELPS M. FREER.

Witnesses:
 E. MAY,
 JOHN C. WHITE.